United States Patent [19]

Toda et al.

[11] 4,339,682

[45] Jul. 13, 1982

[54] ROTATIVE MOTOR USING A PIEZOELECTRIC ELEMENT

[75] Inventors: Minoru Toda; Susumu Osaka, both of Machida, Japan

[73] Assignee: RCA Corporation, New York, N.Y.

[21] Appl. No.: 189,354

[22] Filed: Sep. 22, 1980

[51] Int. Cl.³ .............................................. H01L 41/08
[52] U.S. Cl. .................................. 310/321; 310/317; 310/328; 310/332
[58] Field of Search ................ 310/321, 323, 330–332, 310/328, 317

[56] References Cited

U.S. PATENT DOCUMENTS

| 3,297,889 | 1/1967 | Breskeno ............................. 310/321 |
| 3,781,955 | 1/1974 | Lavrinenko et al. ............... 29/25.35 |
| 4,019,073 | 4/1977 | Vishnevsky et al. ........... 310/330 X |

FOREIGN PATENT DOCUMENTS

| 143682 | 3/1979 | Fed. Rep. of Germany ...... 310/328 |
| 399036 | 3/1974 | U.S.S.R. .............................. 310/328 |
| 681479 | 8/1979 | U.S.S.R. .............................. 310/328 |

OTHER PUBLICATIONS

Piezo-Electric Synchronous Motor: Simple Clock Drive, by Arlt et al., *Electromechanical Design*, Oct. 1972, pp. 22–27.

*Primary Examiner*—Mark O. Budd
*Attorney, Agent, or Firm*—Glenn H. Bruestle

[57] ABSTRACT

A rotative motor includes a member mounted to rotate freely. A pair of piezoelectric bimorph elements are excited from a source of alternating current so that free ends of the respective elements vibrate ninety degrees out of phase. The central point of an elastic member connected between the free ends of the elements is in frictional contact with the rotatable member. The central point exhibits a physical displacement circular in shape, imparting a rotary motion to the rotatable member.

6 Claims, 14 Drawing Figures

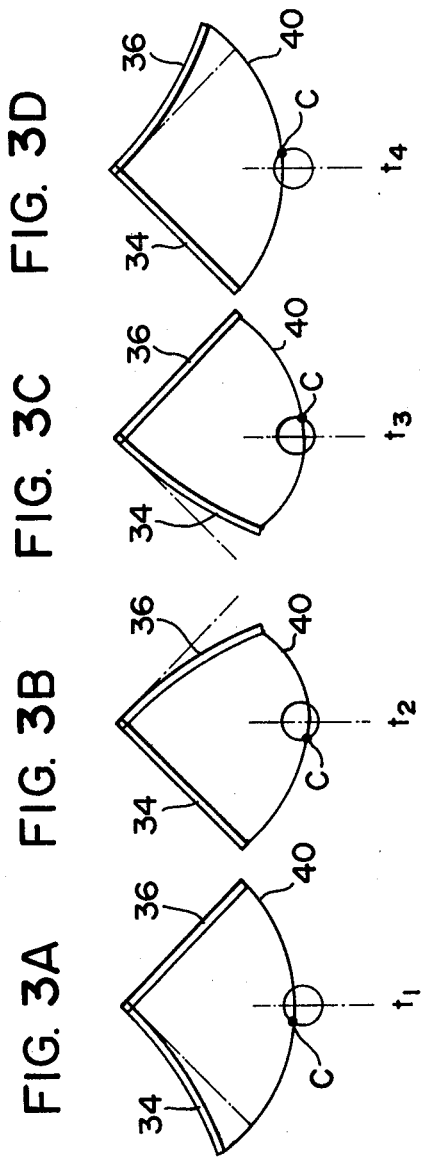

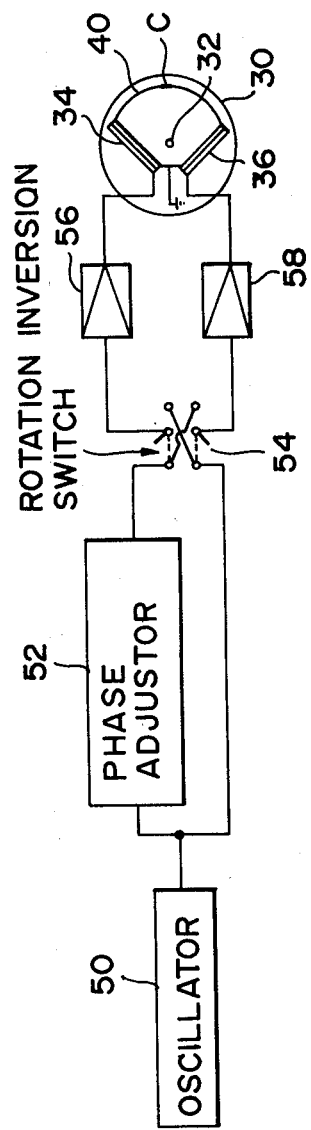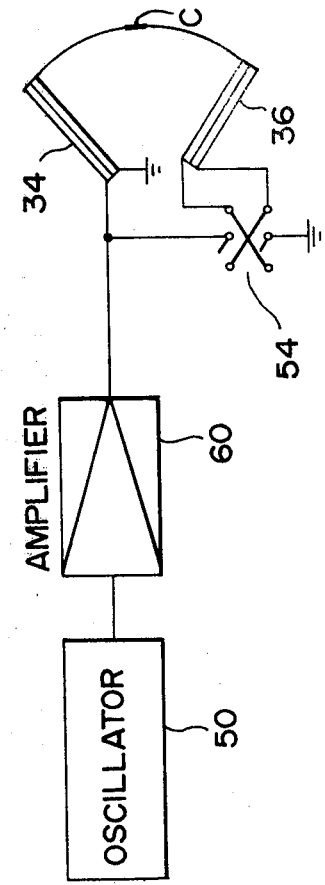

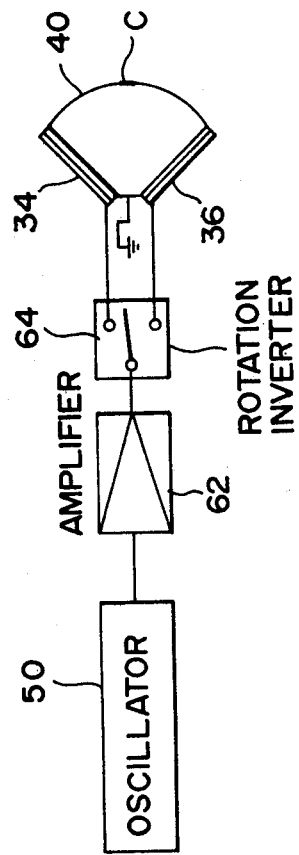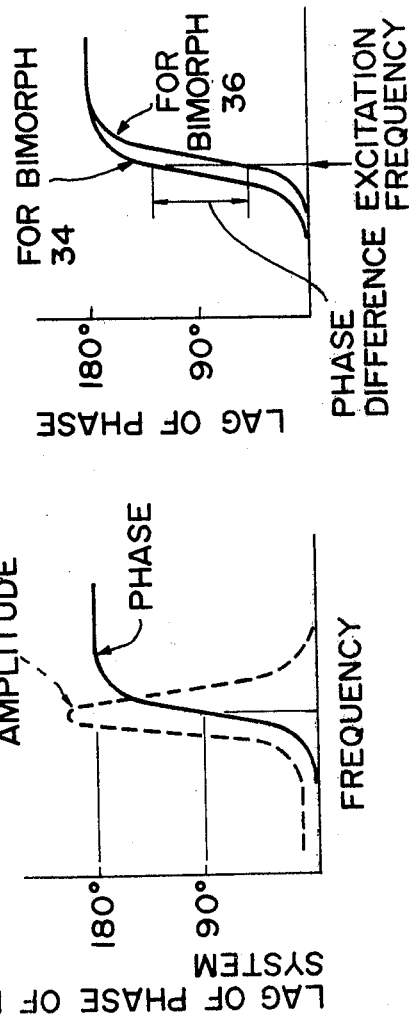

ROTATIVE MOTOR USING A PIEZOELECTRIC ELEMENT

This invention relates to rotative motors, and particularly, to a rotative motor using the vibration effect of a piezoelectric element.

BACKGROUND OF THE INVENTION

Different forms of rotative motors are known. Typical rotative motors use electromagnetics to convert electrical energy to mechanical energy. The construction of a motor of this type can be complicated. Materials such as copper or iron are used so that such a motor can be difficult to use due to its weight. The susceptibility of electromagnetic motors to the influence of magnetic fields limits the use of such motors in many applications.

A particular problem occurs when efforts are made to miniaturize electromagnetic motors. While it is possible to scale down the size of the motors to produce low-power units, the electrical conversion efficiency is appreciably reduced and, furthermore, the fabrication of the miniaturized units can be extremely complex. Presently available commercial electrical motors are not suitable for use in many applications at the low power region. There is a need in the art for a rotative motor which is characterized by simple structure, lightweight, low power consumption, easy control of speed and direction, and the absence of magnetic field interference with other devices and systems employed with the motor.

SUMMARY OF THE INVENTION

A rotative motor is provided which converts electrical energy into mechanical energy without employing magnetic circuits. A pair of piezoelectric bimorph elements is mounted to be driven from a suitable source of alternating current, with a free end of each element exhibiting a mechanical vibration at a frequency determined by that of the alternating current source. An elastic member connects the free ends of the elements with a central point of the elastic member in frictional contact with a rotary member. The bimorph elements are excited so that a phase difference of the vibration at the respective free ends connected by the elastic member imparts through the elastic member a continuous rotary motion to the rotary member.

BRIEF DESCRIPTION OF THE DRAWING

FIG. 2 (FIGS. 2A and 2B) and 3 (FIGS. 3A through 3D) explain the operation of the embodiment shown in FIG. 1.

FIGS. 6 and 7 show excitation circuits for the piezoelectric elements in the embodiments of FIGS. 1 and 5.

FIGS. 8 and 9 are curves used in the discussion of FIG. 7, and

FIG. 10 shows another excitation circuit for use with the embodiments of FIGS. 1 and 5.

DESCRIPTION OF THE PREFERRED EMBODIMENT

Piezoelectric material is known to extend and contract in accordance with the direction of polarization thereof, according to the polarity of an electric field applied thereto. An element can be made of piezoelectric material so that it will bend according to the instantaneous value of an applied electric field. Ceramic materials, for example, PZT, are known which exhibit a piezoelectric effect. An alternating current voltage applied to a bimorph comprising two layers of ceramic material causes the ceramic layers of the bimorph to expand or contract depending upon the sign of the voltage. Thus, if a bimorph element is formed of ceramic material with one end fixed to a suitable support structure, the free end vibrates at a frequency determined by the frequency of the alternating current voltage applied to the bimorph.

Figure 1:
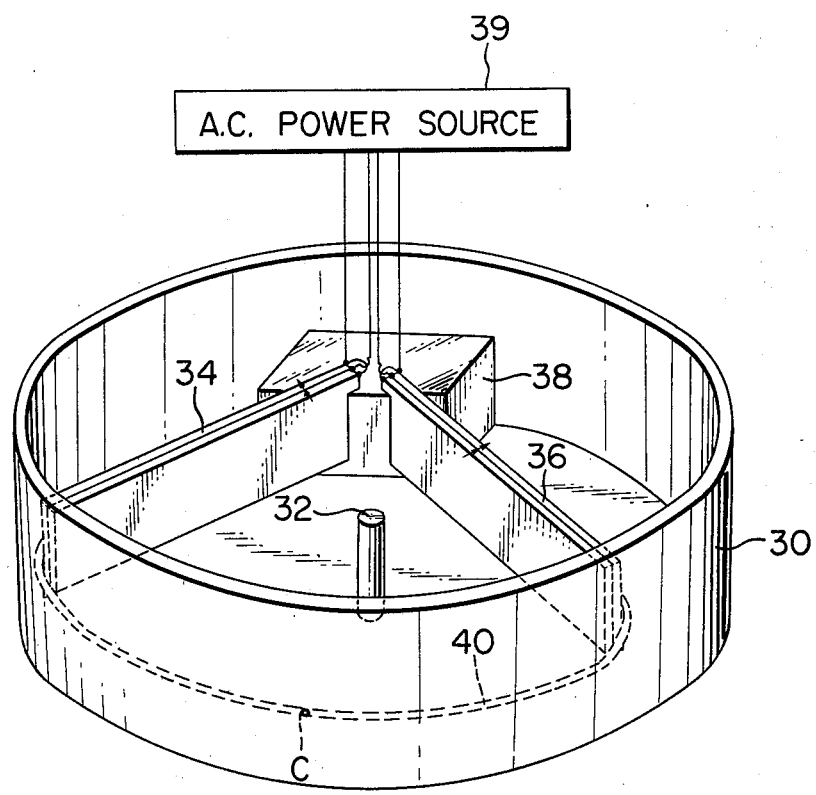
FIG. 1 shows one embodiment of the present invention.

Referring to FIG. 1, a rotary member 30 is constructed and mounted to freely rotate clockwise or counterclockwise about an axis 32. A pair of piezoelectric bimorph elements 34 and 36, which may be constructed of a piezoelectric ceramic material, for example, are mounted at an optional angle to one another by a supporting member 38. Elements 34 and 36, by way of example, are shown in FIG. 1 as mounted substantially orthogonal to one another. The free end of element 34 is connected by an elastic member 40 of arc in shape, for example, a band plate or wire, to the free end of the second element 36. The elastic member 40 is firmly bonded to the free end of the respective bimorph elements 34 and 36. The central point C of the elastic member 40 frictionally contacts the surface of the rotary member 30. The two bimorph elements 34 and 36 are driven from an alternating current power source 39.

In FIG. 1, it is assumed that the respective two layers of the bimorph element 34 or 36, have the same polarization, for example, orthogonal to the electrode surfaces coated on opposite sides of each layer as shown by a solid arrow indicating the direction of polarization of the layers. One terminal of the alternating current power source is connected to the inner electrodes of each layer of the bimorph element 34 or 36, a second terminal of the alternating current power source being connected to the outer electrodes of each layer of the element 34 or 36, respectively. Therefore, the two layers of a bimorph element 34 or 36 are respectively driven by a different polarity of the applied electric field. Thus, the free ends of the respective bimorph elements 34 and 36 vibrate at a frequency determined by the frequency of the alternating current source. The vibration amplitude is a maximum near the mechanical resonance of the piezoelectric element structures.

The central point C of the elastic member 40 moves as a function of the combined vibrations at the free ends of the respective bimorph elements 34 and 36. When the vibration component at the free end of one bimorph element 34 is 90° out of phase with the vibration component at the free end of the other bimorph element 36, the generated physical displacement of the point C is circular in shape. Thus, if the central point C is in frictional contact with the surface of the rotary member 30, the physical displacement at point C will impart a rotary motion to the member 30. The speed of rotation will depend upon the vibrational frequencies and amplitudes of the bimorph elements 34 and 36. The direction of the rotation of the member 30 will depend upon whether the phase of vibration for one of the bimorph elements 34 leads or lags by 90° the phase of the vibration of the other bimorph element 36.

In FIG. 2A, the solid arrows indicate the vibrational direction of the respective bimorph elements 34 and 36. The broken arrow indicates a displacement of the central point C of the elastic member 40. If the bimorph elements 34 and 36 are driven by an alternating current power source to vibrate in the same phase, the central point C of the elastic member 40 simply moves on a line between point C' and C" as shown in FIG. 2A. When the bimorph elements 34 and 36 are driven by the alternating current power source to vibrate 180° out of phase, the central point C of the elastic member 40 moves along a line C', C" as shown in FIG. 2B, which is perpendicular to the line C', C" in FIG. 2A. Thus, if the vibrating phases of the two bimorph elements 34 and 36 are 90° out of phase, the locus of motion of the central point C of the elastic member 40 is a circle.

Figure 4:
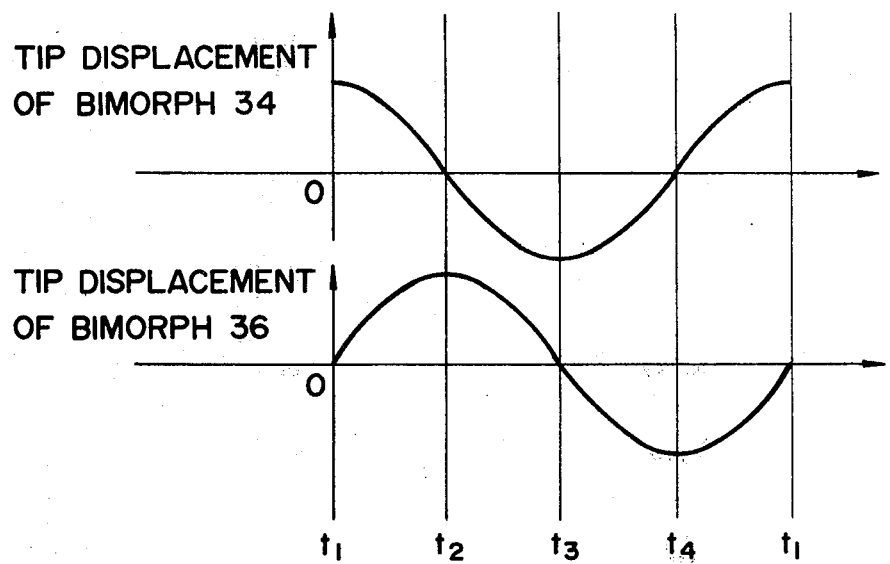
FIG. 4 is a pair of curves used to explain the operation of the embodiment shown in FIG. 1.

FIGS. 3A through 3D present the passage of time from T1 to T2 to T3 to T4 to T1, where there exists a 90° phase difference at each time in the vibrating phases of the bimorph elements 34 and 36. FIG. 4 illustrates the relationship between time and the displacement of the vibrating tips of the respective bimorph elements 34 and 36. From the curves of FIG. 4, taken with the views in FIG. 3, the displacement of the two bimorph elements, which vibrate 90° out of phase, in combination produce at point C a circular motion. As presented in FIGS. 3 and 4, the phase of vibration at the tip of bimorph element 34 is 90° in advance of the phase of the bimorph element 36 vibrations. Therefore, the circular motion at point C will be counterclockwise. If the phase of the bimorph element 36 vibration is made 90° in advance of the bimorph element 34 vibration, then the circular motion will be clockwise.

The rotational direction of the rotary member 30 depends on that of the central point C of the elastic member 40. When the central point C of the elastic member 40 frictionally contacts the surface of the rotary member 30, the rotary member 30 will rotate in a direction according to the phase relationship between the two vibrating bimorph elements 34 and 36 at a constant speed. Preliminary observation suggests that speeds of several hundred revolutions per minute with a torque of a few gram-cm is possible. To improve the frictional contact between the elastic member 40 and the rotary member 30, the inside of the member 30, which may be of a metal construction, may be coated by a frictional material such as rubber and/or a small piece of a rubber plate 46 can be attached at a point C to the elastic member 40. The arrangement shown in FIG. 5 may be used to further improve the friction between the elastic member 40 and the rotary member 30. The supporting member 38 for the two bimorph elements 34 and 36 is coupled to another supporting member 42 through one or more springs 44, producing a constant force between the driven point 46 on the elastic member 40 and the surface of the rotary member 30. Minimal slippage can result.

In a typical construction of the embodiment shown in FIG. 1, a piezoelectric bimorph element 34 or 36 can be a ceramic bimorph 0.3 cm wide, 1.4 cm long and 0.06 cm thick. The alternating current voltage is 140 volts and 1 mA at a frequency of 800 Hz with force factor cos $\phi$ of 0.25, causing the rotation speed of 800 revolutions per minute with no load or 300~400 r.p.m. with a torque of 2~3 gram-cm.

Figure 5:
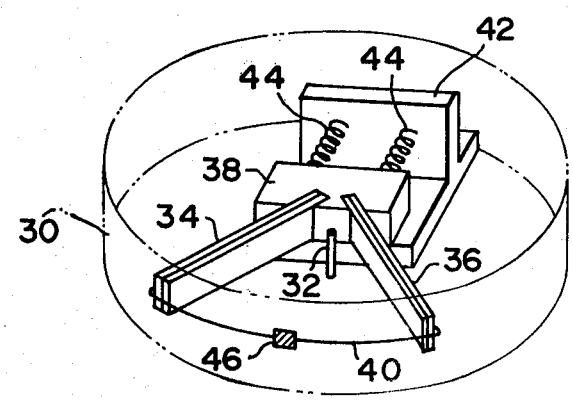
FIG. 5 shows another embodiment of the present invention.

FIG. 6 illustrates one circuit for exciting the bimorph elements 34 and 36 of the embodiments shown in FIGS. 1 and 5. An alternating current voltage is generated by an oscillator 50. The output of the oscillator 50 is fed over one path directly to a rotation inversion switch 54 and is fed over a second path including a phase adjustor 52 to the switch 54. Depending upon the setting of the switch 54, the output of the oscillator or of the phase adjustor 52 is fed through an amplifier 56 to the bimorph element 34. Assuming that the switch 54 is set so that the output of the phase adjustor 52 is fed through the amplifier 56 to the bimorph element 34, the output of the oscillator 50 will be fed directly through a second amplifier 58 to the bimorph element 36. The phase adjustor 52 provides a 90° phase shift between the alternating current voltages applied through the switch 54 to the respective bimorph elements 34 and 36. The bimorph elements 34 and 36 are identical in construction. The direction of rotation of the rotary member 30 can be determined in accordance with the setting of the switch 54. Alternatively, the motor direction can be altered by providing at the phase adjustor 52 means for inverting the phase of the alternating current voltage at the output thereof.

The circuit of FIG. 6 is one way of providing electrically the 90° out of phase excitation of the two bimorph elements 34 and 36. Such excitation may also be provided by a mechanical delay. Mechanical systems including a mass such as the bimorph elements 34, 36 generally have a phase of oscillation different from that of the excitation source due to inertia and related effects. As represented in FIG. 8, at resonance the mechanical system can lag by 90° and by approximately 180° above the resonant frequency. If the mechanical system is assumed to include the two bimorph elements and if the mechanical resonant frequency is slightly different for the two bimorphs, the phase of the bimorphs will be different even if they are connected in parallel to the excitation source. As shown in FIG. 9, the two bimorph elements exhibit different phases at the excitation frequency. This phenomenon can be used to produce the circular motion of the central point C on the member connecting the two bimorph elements, as shown in FIG. 7.

In FIG. 7, the resonant frequency of the two bimorph elements 34 and 36 is adjusted to provide an asymmetrical structure. Thus, one element can be made longer than the other or additional weight can be added to the end of one element. The output of the oscillator 50 is coupled through an amplifier 60 to one of the bimorph elements 34. The output of the amplifier 60 is also coupled through a switch 54 to the other bimorph element 36. By determining the different mechanical resonant frequencies of the bimorph elements, the bimorph elements can be excited to vibrate with a phase difference to cause the motion of the point C and the resultant movement of the rotary member. The rotation direction is determined according to the polarity of the bimorph element 36 through the setting of the switch 54.

Another circuit using mechanical delay to provide the out of phase excitation to the bimorph elements 34 and 36 is shown in FIG. 10. Similar bimorph elements 34 and 36 are provided. An alternating current voltage generated by an oscillator 50 is applied through an amplifier 52 and a rotation inverter 64 to only one of the bimorph elements 34 or 36. Assuming that the excitation voltage from the oscillator 50 is applied only to the bimorph element 34, the excited vibration at the free end of the bimorph element 34 is transmitted to the other bimorph element 36 by the wire or band 40 which connects the respective free ends of the two bimorph elements. At resonance, the phase of the vibration of the bimorph element 36 lags by 90° the phase of the vibration of the driven bimorph element 34. Therefore, the central point C of the elastic member 40 moves in a circular path. If the inverter 64 is set so that only the bimorph element 36 is driven from the oscillator 50, the rotation direction of the point C reverses compared to the rotation direction of the point C when only the bimorph element 34 is driven from the oscillator 50. Because the two bimorph elements 34 and 36 are identical in structure, the resonant frequencies of the two bimorph elements 34 and 36 are the same.

What is claimed is:

1. In combination,
  a rotatable member,
  first and second piezoelectric elements secured at one end to a support at an optional angle to one another, the oppposite ends of said elements being free to vibrate,
  an elastic member connected between said free ends with the central point of said elastic member in frictional contact with the surface of said rotatable member, and
  means for exciting said elements to cause by a phase difference of the vibration at the respective free ends of said elements the central point of said elastic member to have a circular physical displacement to rotate said rotatable member in a direction determined by said phase difference.

2. The combination claimed in claim 1 and wherein said elements are ceramic bimorphs.

3. The combination claimed in claim 1 and wherein said elements are driven by said exciting means from an alternating current source, said alternating current frequency determining the vibration frequency of said free ends and thereby the speed of said rotatable member.

4. The combination in claim 1 and including means for spring loading said support to provide a constant force at the contact of said central point of said elastic member and the surface of said rotatable member.

5. The combination as claimed in claim 1 and wherein said elements are excited from an alternating current source, means for applying said alternating current to one element 90° out of phase with the alternating current applied to the second element providing a 90° phase difference of the vibrations at said free ends.

6. The combination as claimed in claim 1 and wherein said elements are excited from an alternating current source, said elements being driven by said alternating current with a mechanical delay resulting in a 90° phase difference of the vibrations at said free ends.

* * * * *